United States Patent [19]
Goebel

[11] Patent Number: 4,817,429
[45] Date of Patent: Apr. 4, 1989

[54] METHOD AND APPARATUS FOR OPTIMIZATION OF RUNNING CONDITIONS OF AN AUTOMOBILE WHEEL

[75] Inventor: Eickhart Goebel, Pfungstadt, Fed. Rep. of Germany

[73] Assignee: Hofmann Werkstatt Technik GmbH, Pfungstadt, Fed. Rep. of Germany

[21] Appl. No.: 53,775

[22] Filed: May 26, 1987

[30] Foreign Application Priority Data

May 26, 1986 [DE] Fed. Rep. of Germany ....... 3617625

[51] Int. Cl.$^4$ .............................................. G01M 1/14
[52] U.S. Cl. ........................................ 73/459; 73/462
[58] Field of Search .............. 73/459, 462; 364/508 X

[56] References Cited

U.S. PATENT DOCUMENTS

4,223,386  9/1980  Maruyama et al. ................. 364/506
4,302,966 12/1981  Ohnishi et al. ......................... 73/66

Primary Examiner—Stewart J. Levy
Assistant Examiner—Robert P. Bell
Attorney, Agent, or Firm—Fleit, Jacobson, Cohn & Price

[57] ABSTRACT

Optimization of running conditions of an automobile wheel is achieved by matching (readjustment of tire relative to rim) after two measuring runs of the tire/rim assembly and in which the static and dynamic unbalance vectors of the tire and rim include coefficients of influence on said running conditions.

11 Claims, 2 Drawing Sheets

(A)

(B)

METHOD AND APPARATUS FOR OPTIMIZATION OF RUNNING CONDITIONS OF AN AUTOMOBILE WHEEL

FIELD OF THE INVENTION

This invention relates to a method for optimizing running conditions of an automobile wheel.

BACKGROUND OF THE INVENTION

German patent application DE-OS No. 30 03 127, laid open to public inspection, pertains to a method in which a tire and rim, when assembled, are readjusted relative to each other such that static unbalance forces of the tire and rim are directly opposed. For determination of static unbalance forces of the rim on the one hand and of the tire on the other hand, the static unbalance of the rim is determined in a first measuring run and then the tire is fitted on the rim in any arbitrary position. Next, the unbalance of the tire/rim assembly is measured, thus determining static tire unbalance by vector subtraction of the unbalances of the tire rim assembly and of the rim. The tire is then readjusted relative to the rim so that the static unbalance force of the rim is directly opposed to the static unbalance force of the tire. This method of readjusting the tire relative to the rim in a more or less defined position is called "matching". With the above method, it is necessary to determine first static unbalance of the rim without the tire fitted. After this measuring run, the tire has to be mounted on the rim and another measuring run carried out. In this case, the unbalances which are due to geometric deformations of the rim, such as eccentricities or run-out, are not taken into account. If such a geometric deformation of the rim exists, running conditions are not necessarily improved, or might even become worse when the tire is readjusted relative to the rim.

SUMMARY OF THE INVENTION

It is an object of the present invention to provide a method and an apparatus for optimizing running conditions of a vehicle wheel where actual influences on wheel running conditions are taken into account to obtain optimum conditions.

The invention provides a favorable way of performing two measuring runs of a tire/rim assembly in order to determine the optimum conditions, that is the tire is fitted on the rim in both measuring runs, but readjusted relative to the rim by a given angle in the second run.

On the assumption that at most only negligible non-uniformities of mass distribution are present in the rim, the measured data obtained during the two measuring runs is used to determine static and dynamic unbalance vectors, or their first harmonic, which is due to non-uniform mass distribution in the tire and geometric deformation (eccentricity or run-out) of the rim. With the tire fitted on the rim, the geometric deformations of the rim show themselves in the form of unbalance forces because such deformation of the rim brings the tire into an eccentric position where resulting unbalance forces are an obvious consequence of the geometric deformations of the rim.

Optimization of running conditions such as achieved with the inventive method and apparatus is based on considerations that unbalance forces due to non-uniform mass distribution of the tire will have to be opposed to unbalance forces due to geometric deformations of the rim. Required unbalance vectors are determined in the two measuring runs.

If the rim is of inferior quality, presenting non-uniform mass distribution which will involve unbalance forces in the tire/rim assembly, another measuring run is carried out for the rim alone to measure and eliminate the unbalance forces. Such elimination is possible either by fitting relative balance weights on the rim, or by storing measured unbalance forces and taking them into account when subsequently proceeding with optimization in the usual way. Measurement of the rim alone is preferably carried out before the two measuring runs of the tire/rim assembly.

Substantially, perfect optimization of running conditions requires that unbalance forces resulting from non-uniform mass distribution of the rim are eliminated either by relative unbalance correction on the rim, or by taking them into account in the calculations to follow.

For determination of the angle of readjustment of the tire relative to the rim, which will be applicable in the matching process, the static and dynamic unbalance vectors previously determined are multiplied by influence coefficients which are proportional to different influences on the running conditions of the automobile wheel.

With the inventive method, the fact that static unbalance has quite a different influence on wheel running conditions than dynamic unbalance may be taken into account. The fact that tire unbalance has quite a different influence on wheel running conditions than the unbalance resulting from geometric deformations of the rim may also be taken into account.

The fact that the unbalance forces at the outside of the tire/rim assembly fitted on the car act upon wheel suspension with quite a larger lever arm that the ones at the inside of said assembly may also be taken into account.

By turning over the tire about an axis perpendicular to its axis of rotation it is possible to oppose unbalances acting on the tire and unbalance forces due to the rim which are situated in different correction planes in the same matching process.

Optimization of wheel running conditions such as achieved with the inventive method and apparatus makes use of the fact that in most cases bad running conditions, which are substantially due to unbalance, radial and lateral force variations and geometric deformations, have identical causes. Furthermore, running conditions are improved due to the fact that there are only minor unbalance forces after a matching run, which can then be balanced with small balance weights. This is of special advantage in particular with respect to reduction of non-uniform mass distribution in the tire contact area which also has an effect on wheel running conditions.

BRIEF DESCRIPTION OF DRAWINGS

A preferred embodiment of the invention is illustrated in the accompanying drawings wherein.

DESCRIPTION OF THE PREFERRED EMBODIMENT

Figure 1:
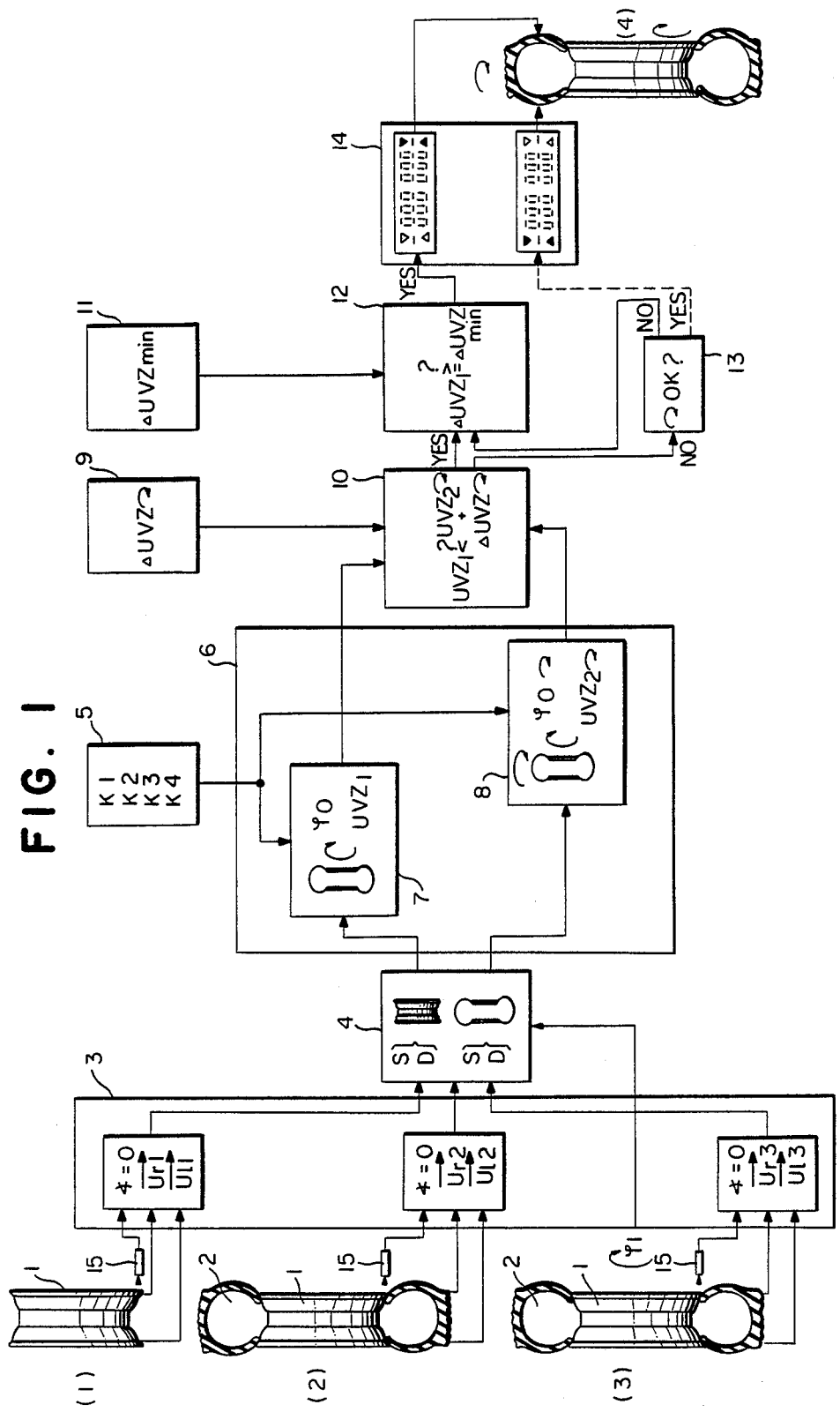
FIG. 1 is an electronic block diagram of the inventive apparatus.

Running conditions of an automobile wheel comprised of rim 1 and tire 2 fitted thereupon may be improved by matching, that is readjustment of tire 2 relative to rim 1, by using an electric circuit such as illustrated in FIG. 1. Measuring runs are performed on a wheel balancing machine, known per se and not shown in detail, and where the rim or tire/rim assembly is fitted on the balancing mandrel in the conventional way. During the measuring run, transducers, which are not represented in detail, detect the amount and location of unbalances and an electronic analyzer 3 connected to said transducers differentiates between unbalance forces $\vec{U}_r$ of the unbalance vector in a righthand correction plane and the unbalance forces $\vec{U}_l$ of the unbalance vector in a lefthand correction plane. A scanner 15 scans a datum mark on rim 1 such as the valve or any other fixed reference on rim 1 and forwards a relative phase reference signal to the electronic analyzer 3, for example for 0° position.

There is a first procedure in which measurement is taken of automobile wheels having rims with negligible non-uniform mass distribution. Steel rims, for example, are generally supposed to be have such negligible non-uniform mass distribution so that the measuring run (1) of rim 1 without a tire fitted (see FIG. 1) can be omitted. Of course, it is possible to perform said measuring run (1) of the rim alone at any rate to find out whether, or not, there are unbalances in the rim which are caused by non-uniform mass distribution and which would have to be eliminated in the following calculation, or by balance weights to be fitted on the rim.

For measuring run (2) the tire 2 is fitted on rim 1 in any arbitrary angular position. In said measuring run the unbalances of left and right correction planes are measured and the unbalance vectors $U_{l2}$ and $U_{r2}$ of the left and right correction planes respectively are determined in the electronic analyzer 3.

After said measuring run tire 2 is readjusted by a given angle $\phi_1$ relative to rim 1. Said angle is an arbitrary one, but preferably 180°, and is stored for analysis in vector calculator 4. Then a third measuring run (3) is performed during which unbalance vectors $\vec{U}_{r3}$ and $\vec{U}_{l3}$ of the right and left correction planes respectively are determined by the electronic analyzer 3.

Figure 2:
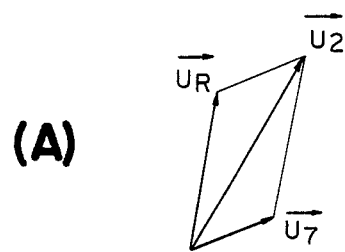
FIGS. 2A and FIG. 2B are vector diagrams illustrating the inventive method.
Figure 2:
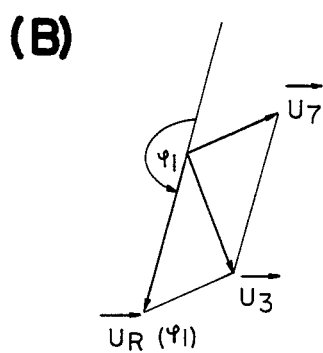

In FIG. 2, the two vector diagrams (A) and (B) illustrate how the positions of the measured unbalance vectors $\vec{U}_2$ (indicative of the unbalance vectors of both correction planes in the second measuring run) and $\vec{U}_3$ (indicative of the unbalance vectors of both correction planes in the third measuring run) change. Said unbalance vectors result from individual unbalance vectors $\vec{U}_R$ of the tire and $\vec{U}_{FF}$, which is due to geometric deformations of the rim, with diagram (B) showing the position of $\vec{U}_R (\phi_1)$ after readjustment of tire 2 by angle $\phi_1$ (e.g. 180°) relative to rim 1. The unbalance vector $\vec{U}_F$ is identical for both measuring runs, whereas the individual unbalance vector $\vec{U}_R(\phi_1)$ and the resultant unbalance vector $\vec{U}_3$ measured in the second measuring run of the tire/rim assembly change. Since the angle of readjustment $\phi_1$ and the measured data are known, said measured data being the unbalances $\vec{U}_2$ and $\vec{U}_3$ of the automobile wheel indicative of the unbalance vectors $\vec{U}_{r2}$, $\vec{U}_{l2}$ $\vec{U}_{r3}$ and $\vec{U}_{l3}$ determined for left and right correction planes respectively inform of first harmonics by the electronic analyzer 3, and all the more since the unbalance vector $\vec{U}_F$ of the rim is constant in both measuring runs (2) and (3), static and dynamic unbalance vectors of the tire can be determined on the basis of the following relationships:

$$\vec{D}_r = \tfrac{1}{2}(\vec{U}_l - \vec{U}_r)$$
$$\vec{D}_l = \tfrac{1}{2}(\vec{U}_r - \vec{U}_l)$$
$$\vec{S} = \vec{U}_l + \vec{U}_r$$

in which
$\vec{D}_r$ is the dynamic unbalance vectors of the right correction plane
$\vec{D}_l$ is the dynamic unbalance vectors of the left correction plane
$\vec{S}$ is the static unbalance vectors
both of the rim and the tire of the wheel assembly.

The dynamic unbalance vectors of left and right correction planes respectively of tire and rim and the relative static unbalance vectors of tire and rim are determined in vector calculator 4.

If there are rims where non-uniform mass distribution causes static and dynamic unbalance forces to such an extent that they have to be taken into account at any rate, said unbalance forces will have to be eliminated in the calculations performed by vector calculator 4 unless eliminated by fitting relative balance weights on the rim itself. For this purpose the unbalance vectors $\vec{U}_{r1}$ and $\vec{U}_{l1}$ are determined for the two correction planes by analyzer 3 on the basis of the data supplied by said transducers. Such a first measuring run (1) with the rim alone is strongly recommended in particular with light-alloy rims.

In the optimization circuit 6 connected to said vector calculator 4 the dynamic and static unbalance vectors due to the rim and determined for the tire are multiplied by the influence coefficients K1, K2, K3 and 4 which are stored in memory 5 after having been entered by a keyboard by any other input device. The influence coefficientt K1 refers to the influence by dynamic unbalances, the influence coefficient K2 to the influence by static unbalances, the influence coefficient K3 to the difference by influences by rim and tire and the influence coefficient K4 to the difference in influences by the outer and the inner sides of the wheel on the running conditions of the automobile wheel. Said influence coefficients are empiric values which depend on the automobile wheel and on the type of car. They are about the followig quantity:

K1 ~0.70
K2 ~1.00
K3 ~1.00
K4 ~1.20

In the optimization circuit 6 the unit 7 determines the optimum matching angle $\phi_o$ which is associated with a first minimum value of bad running conditions $UVZ_z$ which is achievable by and left after matching. Furthermore, another unit 8 in the optimization circuit 6 determines whether reduction of the first value of bad running conditions left after matching $UVZ_1$ can be achieved by turning the tire over about an axis perpendicular to its axis of rotation and by readjusting the tire by the associated matching angle $\phi_o$, hence by a second achievable value of bad running conditions $UVZ_2$ left after turning over. For example, turning over might further reduce the first value of bad running conditions left after matching if opposable unbalance forces are present in different correction planes in tire and rim.

In comparator 10, which is connected after the optimization circuit 6, a decision is made on the basis of the difference of the two values $UVZ_1$ and $UVZ_2$, possibly by taking the difference limit $\Delta UVZ$ stored in memory 9 into account, as to whether the first value $UVZ_1$ left after matching is inferior to the second value $UVZ_2$ left after turning over, with said limit $\Delta UVZ$ stored in memory 9 being added to the second value $UVZ_2$ as need may arise. If said limit value $\Delta UVZ$ is chosen accordingly, it can be determined if turning over of the tire is worth the effort involved.

In a second comparator 12, the differences $\Delta UVZ_z$ between the value of bad running conditions achievable after a first readjustment of tire 2 relative to rim 1 by angle $\phi_1$ between measuring runs (2) and (3) both carried out with the tire/rim assembly on one hand and the first value of bad running conditions $UVZ_1$ achievable after matching by a second readjustment of the tire relative to the rim by angle $\phi_o$ on the other hand, is compared with another minimum limit $\Delta UVZ_{min}$ stored in memory 11. This is to determine if matching, that is exactly speaking the second readjustment of tire 2 relative to rim 1 by the matching angle $\phi_o$ is worth the effort involved. Depending on the results of said comparisons there will be no matching at all, or only readjustment of tire 2 relative to rim 1 as a function of matching angle $\phi_o$ or an additional turning over of tire 2 or rim 1. This is accomplished in a procedure designated (4) in FIG. 1.

Another decision circuit 13, which is connected after comparator 10, decides whether or not turning over of tire 2 about an axis perpendicular to its axis of rotation is permitted. Display 14 will then read out the relative matching angle by which tire 2 has to be readjusted relative to rim 1. Readjustment of tire 2 relative to rim 1 is then preferably started from the latest position of tire 2 with respect to rim 1 in measuring run (3). When the matching angle $\phi_o$ is determined, or when the tire is readjusted relative to the rim for a second time, the stored angle $\phi_1$ by which tire 2 was readjusted relative to rim 1 for a first time after measuring run (2), has to be taken into account.

With the method and apparatus object of the present invention the influences adversely affecting running conditions of an automobile wheel are reduced to a minimum. The most favorable conditions are produced to achieve optimum running conditions of the tire/rim assembly by matching and, if necessary, turning over of the tire relative to the rim. After matching balance weights must be fitted to the tire/rim assembly to eliminate the residual unbalance, if any. Furthermore, static and dynamic unbalance vectors of several tires and rims determined successively on the automobile wheels under test can be stored. By comparison of said stored data another optimization of running conditions can be achieved in that more favorable assemblies of tires and rims than the present assemblies can be found out by calculation. The tires and rims of the automobile wheels in question can then be demounted, exchanged and remounted, thus avoiding that for example, an automobile wheel having a good rim and a poor tire or good tire and a poor rim, cannot be optimized with respect to running conditions. By exchanging tires and rims as a function of the result of comparison between unbalance vectors so far determined optimization is easily accomplished with the wheels under test.

In addition, it is possible to use comparators and respective limit or minimum values as well as admissible comparative figures for residual values of bad running conditions in order to read out if there are any unfavorable configurations causing bad running conditions, or unbalance, or conditions which cannot be improved any more with the automobile wheels under test.

What it claimed is:

1. In a method for optimizing running conditions of an automobile wheel comprised of a rim and a tire fitting on the rim, the method including the step of determining unbalance caused by the tire and rim in measuring runs including at least one measuring run in which the tire is fitted on the rim in an arbitrary position and in which the tire and rim are readjusted (matched) relative to each other so that forces produced by the tire are opposed to forces caused by the rim, the improvements wherein:
   after said at least one measuring run, another measuring run is performed in which tire and rim are readjusted relative to each other by a given angle;
   both static and dynamic unbalance vectors of the tire and static and dynamic unbalance vectors due to geometric deformations of the rim are determined on the basis of the data measured in said two measuring runs; and
   the matching procedure comprises readjustment of the tire and rim relative to each other by an angle which is calculated on the basis of the static and dynamic unbalance vectors thus determined and said given angle, such that unbalance forces due to non-uniform mass distribution of the tire are opposed to unbalance forces due to geometric deformations of the rim.

2. A method as set forth in claim 1 in which static and/or dynamic unbalance vectors of the rim alone are determined in a further measuring run for elimination of non-uniforms mass distribution of the rim.

3. A method as set forth in claim 1 in which static unbalance vectors are multiplied by an influence coefficient proportional to influence of static unbalance on running conditions and dynamic unbalance vectors by an influence coefficient proportional to influence of dynamic unbalance on running conditions.

4. A method as set forth in claim 1 in which static and dynamic unbalance vectors are furthermore multiplied by an influence coefficient which is proportional to the difference of influences of tire unbalances and unbalances resulting from geometric deformations on the running conditions of the automobile wheel.

5. A method as set forth in claim 1 in which the static and dynamic unbalance vectors are furthermore multiplied by an influence coefficient which is proportional to the difference of influences of unbalance at the outer side of the wheel and unbalance at the inner side of the wheel on the running conditions of the automobile wheel.

6. A method as set forth in claim 1 in which a first value of running conditions left after readjustment and a second value of running conditions left after first turning over of the tire about an axis perpendicular to its axis of rotation are calculated on the basis of the static and dynamic unbalance vectors determined as well as on the basis of empirical influence coefficients, said calculation being performed before the matching procedure takes place.

7. A method as set forth in claim 6 in which readjustment of the tire relative to the rim is carried out only if said first value of running conditions, which would be left after readjustment, is inferior to a given limit.

8. A method as set forth in claim 6 in which additional turning over of the tire about said axis perpendicular to the axis of rotation is carried out only if said second value of running conditions, which would be left after the first turning over, is inferior to said first value by at least a given difference limit.

9. A method as set forth in claim 1 in which a datum mark on the rim is scanned to have a constant phase reference during all the measuring runs to be performed.

10. A method as set forth in claim 9 in which a value of the wheel forms the datum mark.

11. A method as set forth in claim 1 in which automobile wheels are tested in succession, the measured static and dynamic unbalance vectors of the automobile wheels are stored and compared with each other in order to optimize running conditions by reassembling tires and rims of two difference automobile wheels under test.

* * * * *